United States Patent Office 3,025,242
Patented Mar. 13, 1962

3,025,242
WHITENING AGENT COMPOSITION AND
PROCESS FOR ITS MANUFACTURE
Ralph Crawford Seyler, Wilmington, Del., assignor to
E. I. du Pont de Nemours and Company, Wilmington,
Del., a corporation of Delaware
No Drawing. Filed Mar. 20, 1961, Ser. No. 96,718
6 Claims. (Cl. 252—301.3)

This invention relates to whitening compositions for use in whitening textile fibers and paper. It is an object of this invention to provide a composition of matter for the aforementioned purpose which is in the form of a concentrated aqueous solution, adapted to be diluted to the desired concentration of the treatment bath with minimum mechanical effort, and which will exert a whitening effect equal to the best effects obtainable hitherto from the same whitening agents in other physical forms or modes of application. Another object is to provide a process for preparing said dilutable composition directly from available intermediates with a minimum of handling, and avoiding in particular isolations of intermediate products, removal of by-product salts and similar time consuming and energy wasting operations. Various additional objects and achievements of this invention will become apparent as the description proceeds.

The use of fluorescent agents for whitening textile fibers and paper is per se well known. A class of agents commonly used for this purpose are the bis-triazinyl diaminostilbene derivatives set forth in U.S. Alien Property Custodian specification Serial No. 381,856, published May 11, 1943, and one particularly popular member of this class is the dianilino bis-diethanolamino bis-triazine compound set forth in Example 16 of said A.P.C. specification.

Now, although the above dianilino compound has excellent affinity and exhibits a strong build-up when applied to textiles or paper in relatively large amounts, it becomes unevenly distributed on the substrate and presents an unlevel fluorescent whitening effect, when applied in small amounts. A more level "dyeing" whitening agent has been needed. Besides, the anilino compound is effective as a whitening agent only at a pH above 6.0; below this value the compound precipitates and is lost to use. Such an acidic pH often exists in a paper machine size-bath containing the whitening agent due to the presence of alum accumulated in the bath from the paper sheet passing continuously through the machine. Furthermore, in manufacturing a marketable aqueous concentrate of the said anilino compound, it has been found essential that the bulk of the by-product sodium chloride formed in the synethesis of said compound be removed, so that the concentration of sodium chloride in the marketable concentrate should not be over one per cent by weight. To obtain a marketable solution having this low salt concentration, the whitening agent must be precipitated either by salting or by converting it to the free acid, separated by filtration, washed to remove the sodium chloride present, and then dissolved in a solution of water and a selected co-solvent with or without an alkaline agent as required to attain solution. Such a procedure consumes time and labor, requires extra equipment, and is to be avoided in the interest of economy.

According to my present invention, the aforenoted difficulties and labors are overcome, and an easily dilutable, marketable aqueous concentrate of a potent whitening agent is obtained, firstly by selecting as active ingredient a compound of essentially the same general formula as above except that the two terminal aniline radicals are replaced by radicals of sulfanilic acid. I find that the whitening agent thus obtained is so much more soluble in water than the corresponding dianilino compound that it is no longer necessary to separate therefrom the sodium chloride formed in its synthesis.

Furthermore, the said whitening agent, which to my knowledge is a new compound, can be readily formulated into a stable, marketable aqueous concentrate by admixing therewith a certain proportion, as specified below, of a co-solvent selected from the group consisting of (a) alkanolamines of the formula $(HO-alk)_x-NR_{3-x}$, wherein alk is a bivalent alkane radical of 2 to 4 carbon atoms, R is hydrogen or alkyl of 1 to 2 carbon atoms, and $x$ is an integer from 1 to 3, and (b) a polyethylene glycol of the formula $H(OCH_2CH_2)_nOH$, wherein $n$ is an integer from 4 to 6.

Finally, my novel choice of the fluorescent compound enables me to carry out the synthesis thereof and formation into a marketable concentrate in one continuous operation, without isolating any intermediate products or by-products and with a minimum handling of materials in general.

The process of synthesis and compounding into a marketable concentrate, according to this invention, is in general terms as follows:

Stoichiometric quantities of the requisite initial materials are reacted in a sequence of three condensation steps in an aqueous acetone medium to form the said fluorescent whitening compound; then a co-solvent as above mentioned is added, and a portion of the water is distilled off to form a marketable aqueous concentrate.

In the first condensation step (which follows well known procedure), one mole of 4,4'-diamino-2,2'-stilbenedisulfonic acid, neutralized with sodium carbonate or hydroxide, is reacted at a temperature not exceeding 5° C. with 2 moles of cyanuric chloride (which has been dispersed in water from an acetone solution) to form 4,4'-bis(4,6-dichloro-s-triazin-2-ylamino)-2,2'-stilbenedisulfonic acid, disodium salt. The HCl which is formed in the reaction is neutralized with a base, such as caustic soda or soda ash, maintaining the pH preferably at 3 to 4. When this reaction is complete, as shown by a diazotization test for the presence of any unreacted diaminostilbenedisulfonic acid, 2 moles of sulfonilic acid sodium salt are condensed at 5° to 40° C. with the product of the first reaction to form 4,4'-bis[4-chloro-6-(p-sulfoanilino)-s-triazin-2-ylamino]-2,2'-stilbenedisulfonic acid, tetrasodium salt. The HCl formed in this reaction is neutralized with a base, maintaining the pH at preferably 4 to 6. The completeness of this reaction is likewise determined by testing for the presence of residual sulfanilic acid by diazotization. Finally, without altering the reaction medium, 2 moles of diethanolamine are condensed in the presence of soda ash, at a temperature above 70° C. and pH of 8 to 9, with the product of the first two steps of the reaction to form the final product, 4,4'-bis[4-diethanolamino-6-(p-sulfoanilino)-s-triazin-2-ylamino]-2,2'-stilbene-disulfonic acid, tetrasodium salt.

Optionally, 4 moles of diethanolamine may be used as the reactant in the final reaction, the soda ash being omitted; two moles will condense as stated above, the two moles will neutralize the 2 moles of hydrochloric acid which are formed during the condensation. Thus, in place of forming sodium chloride, diethanolammonium chloride will be formed, and the salt content of the solution will comprise a mixture of 4 moles of sodium chloride and 2 moles of diethanolammonium chloride, rather than 6 moles of sodium chloride, for each two moles of initial cyanuric chloride. When this optional procedure in the third condensation step is followed, the resultant fluorescent whitening agent possesses a pinker shade, which gives a "warmer" white and is often more desirable than the green- or blue-white shade that is produced in the absence of said diethanolammonium chloride.

The third condensation step above is generally effected at a temperature between 70° and 110° C., and preferably at 80° to 95° C. Acetone, which was used in the dispersion of the cyanuric chloride, distills off during this step.

When said third condensation is complete, the reaction mass comprises the whitening agent product as active ingredient, sodium chloride, and possibly in the optional case diethanolammonium chloride, and water. To this mixture is now added an alkanolamine or a polyethylene the temperature of the reaction mass is raised to 40° C. and held at this temperature until a diazotization test shows that condensation is complete. 73 parts of diethanolamine are now added, and the temperature of the reaction mass is raised to 95° C., while allowing the acetone to distill from the reaction mass. After holding the reaction mass at 95° C. for 3 hours, the reaction is complete and contains in solution a compound of the formula

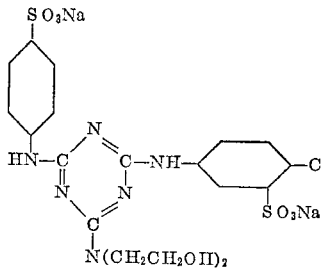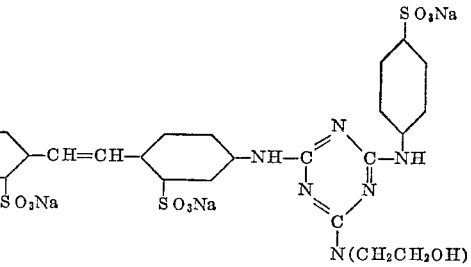

glycol, to act a co-solvent with the water, to give a stable solution of the whitening agent in the presence of the by-product chloride salts.

Typical illustrations of the alkanolamines usable as co-solvent are: the mono-, di- and triethanolamines; mono-, di- and tributanolamines derived from 1-butanol, 2-butanol, or 1-methyl-2-propanol; N-methyldiethanolamine; N,N-dimethylethanolamine; and N,N-diethylethanolamine. The preferred compound is triethanolamine.

Preferred members of the polyethylene glycols for use as co-solvent are those which have from 4 to 6 ethylenoxy units per molecule (i.e. a molecular weight roughly of about 200 to 300).

The preferred concentration of the active ingredient (fluorescent whitening agent) in the ultimate, marketable concentrate is from 10 to 30% by weight. The quantity of co-solvent should be not less than 0.5 times the weight of the active ingredient in the concentrate. Accordingly, it can vary from 5 to 30% by weight of the entire concentrate. The quantity of salt, of course, is incidental and will normally be equal to that formed as by-product in the reaction. Accordingly, it will generally add up to about 6 moles total inert salts per mole of the fluorescent whitening agent in the concentrate, said 6 moles comprising from 4 to 6 moles of sodium chloride and the remainder (if any) being diethanolammonium chloride.

It is remarkable that if an isomeric fluorescent agent derived from metanilic acid (in lieu of sulfanilic) is selected, stable aqueous concentrates of the above active-ingredient concentration are not obtainable (even when the mentioned co-solvents are employed), because of the strong tendency of the isomeric fluorescent compound to be salted out of solution by the action of said by-product quantities of NaCl.

Without limiting this invention, the following examples are given to illustrate my preferred mode of operation. Parts mentioned are by weight.

*Example 1*

A solution containing 50 parts of cyanuric chloride in 260 parts of acetone is mixed with agitation with 650 parts of ice and 150 parts of water. To the resultant dispersion are added slowly 350 parts of a water solution containing 50 parts of 4,4'-diamino-2,2'-stilbenedisulfonic acid previously neutralized with sodium hydroxide. At the same time a 15% solution of soda ash is also fed in to maintain moderate blue coloration on Congo red test paper. The temperature of reaction is not permitted to exceed 5° C. The condensation is tested for completeness by diazotizing a sample of the reaction mass and testing for color formation with R salt.

To the reaction mass are now slowly added 46.7 parts of sulfanilic acid sodium salt and a 15% soda ash solution, to neutralize the liberated hydrochloric acid and maintain a pH of about 4 to 6. During this addition, which may be named 4,4'-bis[4-diethanolamino-6-(p-sulfoanilino)-s-triazin-2-ylamino]-2,2'-stilbenedisulfonic acid, tetrasodium salt.

To the above solution are now added 90 parts of triethanolamine, and the solution is concentrated by distillation, to leave a total of 890 parts of a stable, marketable concentrate, which contains, by weight, 17.7% whitening agent, 10.1% triethanolamine, 1.8% diethanolamine (excess reactant), 3.5% sodium chloride, 4.3% diethanolammonium chloride, and 62.6% water.

When the above concentrate is diluted with water at room temperature to a concentration of 0.1% by weight of the whitening agent and white, sized paper is dipped into the solution, squeezed, and dried at 65° C., the paper is found to be uniformly white and bright and acceptable for commercial use. Moreover, if the diluted treatment bath is made acid to a pH of 4.0, no visible change therein occurs; the solution remains clear and free from any precipitated material and still provides a brilliant whitening effect on paper.

*Example 2*

By the procedure of Example 1, 35 parts of cyanuric chloride, dissolved in 180 parts of acetone and mixed with 450 parts of ice and 105 parts of water, are reacted with 35 parts of 4,4'-diamino-2,2'-stilbenedisulfonic acid previously neutralized with sodium hydroxide. The intermediate product is then condensed with 32.7 parts of sulfanilic acid sodium salt, and this product in turn is heated with 102 parts of diethanolamine, with the simultaneous removal of the acetone. This quantity of diethanolamine is enough to leave 62 parts thereof to serve as co-solvent after the condensation is complete. The final composition (which now has a mass of over 1000 parts due to the addition of 15% aqueous soda ash during the first two condensation steps) is concentrated by distilling off a portion of the water, to give a total of 1000 parts of an aqueous concentrate containing 11% of the whitening agent (of the same formula as in Example 1), 6.2% of diethanolamine, 2.2% of sodium chloride, 2.7% of diethanolamonnium chloride, and 77.9% of water.

When a portion of the above solution is diluted to a concentration of 0.05%, acidified to a pH of 4.5, and applied to paper as in Example 1, a uniform, brilliant whitening effect is obtained. No precipitation of the whitening agent occurs.

*Example 3*

By the procedure of Example 1, 95 parts of cyanuric chloride, dissolved in 500 parts of acetone and mixed with 1235 parts of ice and 285 parts of water, are reacted with 95 parts of 4,4'-diamino-2,2'-stilbenedisulfonic acid previously neutralized with sodium hydroxide. The intermediate condensation product is then condensed with 89 parts of sulfanilic acid sodium salt, and this product in turn is condensed with 108 parts of diethanolamine, with the simultaneous removal of acetone. To the reaction mass are then added 300 parts of polyethylene glycol having (predominantly) the formula $H(OCH_2CH_2)_4OH$, and this final composition is concentrated by distilling off water to give a total of 1000 parts of a clear, homogeneous aqueous concentrate. The latter contains, by weight, 30% of the whitening agent of Example 1, 30% of the above polyethylene glycol, 6.0% of sodium chloride, 7.3% of diethanolammonium chloride, and 26.7% of water.

On dilution of the above concentrate to 0.1% of concentration of whitening agent and application of the dilute solution to paper, a brilliant, level whitening effect is obtained.

*Example 4*

Again by the procedure of Example 1, 86 parts of cyanuric chloride, dissolved in 450 parts of acetone and mixed with 1115 parts of ice and 257 parts of water, are reacted with 86 parts of 4,4'-diamino-2,2'-stilbenedisulfonic acid previously neutralized with sodium hydroxide. The intermediate condensation product is then condensed with 80 parts of sulfanilic acid, and this product in turn is condensed with 49 parts of diethanolamine with the simultaneous feeding in of a 15% solution of soda ash to maintain a pH between 8 and 9. The acetone distills off as the temperature is raised to effect the diethanolamine condensation. To the reaction mass are then added 150 parts of monoethanolamine, and this composition is concentrated by distilling off water to give 1000 parts of a clear concentrate containing 27% of the whitening agent, 15% of monoethanolamine, 8.1% of sodium chloride, and 49.9% of water.

This concentrate, when diluted to a concentration of 0.05% of whitening agent and applied to paper as in Example 1, provides a paper with a high level of whiteness and brightness.

*Example 5*

By the procedure of Example 4, 32 parts of cyanuric chloride, dissolved in 180 parts of acetone and mixed with 400 parts of ice and 100 parts of water, are reacted with 32 parts of 4,4'-diamino-2,2'-stilbenedisulfonic acid previously neutralized with sodium hydroxide. Then in turn the reaction mass is reacted with 30 parts of sulfanilic acid and 18 parts of diethanolamine, employing soda ash to neutralize the by-product hydrochloric acid as it is formed. To the reaction mass are then added 300 parts of tri(2-propanol)amine, and the mass is concentrated by distillation to give a total of 1000 parts of a clear solution containing 10% of the whitening agent, 30% of tri(2-propanol)amine, 3.0% of sodium chloride, and 57% of water.

Paper treated with the above solution, diluted to a concentration of 0.08% of the whitening agent, exhibits an even distribution of the agent, absence of spottiness, and a brilliant fluorescent whitening.

The final liquid concentrate in each of the above examples is a clear, light-yellow or amber-colored solution, which is stable to storage over the range of temperatures normally encountered in warehouses in summer and winter.

It will be understood that the details of the above examples may be varied widely within the skill of those engaged in this art. For instance, the initial cyanuric chloride may be reacted first with the sodium sulfanilate and then with the disodium salt of 4,4'-diamino-2,2'-stilbenedisulfonic acid, the temperature and pH conditions of the two successive condensations being nevertheless the same, respectively, as in the first and second condensation steps in the procedures above set forth. Other permissible variations will be readily apparent.

While the above examples have illustrated the use of my novel brightening composition on paper, it may be applied also, in similar manner, to textile fibers, for instance cotton fabric.

I claim as my invention:

1. A readily dilutable composition for use as a brightening agent for cotton fibers and paper, comprising an aqueous concentrate of a fluorescent whitening agent of the formula

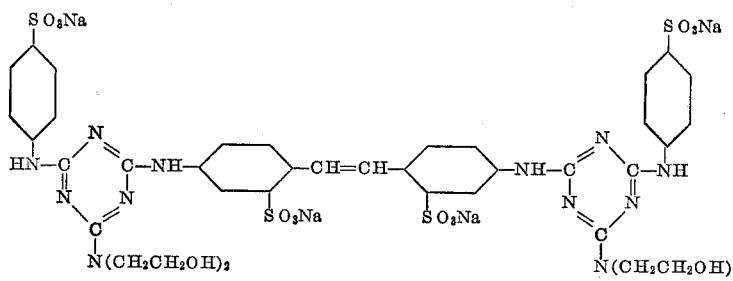

and of a co-solvent selected from the group consisting of (a) alkanolamines of the formula $(HO\text{-}alk)_x\text{---}NR_{3-x}$, wherein alk is a bivalent alkane radical of 2 to 4 carbon atoms, R is a member selected from the group consisting of hydrogen and alkyl of 1 to 2 carbon atoms, and $x$ is an integer from 1 to 3 and (b) a polyethylene glycol of the formula $H(OCH_2CH_2)_nOH$, wherein $n$ is an integer from 4 to 6, the quantity of said fluorescent whitening agent being from 10 to 30% by weight of the entire composition and the quantity of said co-solvent being sufficient to maintain said quantity of fluorescent whitening agent in stable solution in said composition.

2. The composition of claim 1, containing further inert salts from the group which are formed as by-products in the synthesis of said fluorescent whitening agent, but in quantity not exceeding that which is formed in said synthesis.

3. A readily dilutable composition for use as a brightening agent for cotton fibers and paper, comprising an aqueous concentrate of a fluorescent whitening agent of the formula

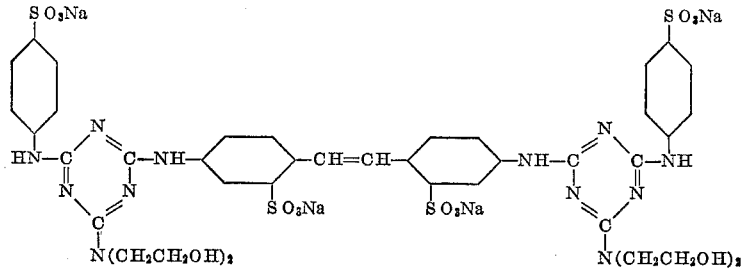

a co-solvent selected from the group consisting of (a) alkanolamines of the formula $(HO\text{-alk})_x\text{—}NR_{3-x}$, wherein alk is a bivalent alkane radical of 2 to 4 carbon atoms, R is a member selected from the group consisting of hydrogen and alkyl of 1 to 2 carbon atoms, and $x$ is an integer from 1 to 3 and (b) a polyethylene glycol of the formula $H(OCH_2CH_2)_nOH$, wherein $n$ is an integer from 4 to 6, and inert salts selected from the group consisting of sodium chloride and diethanolammonium chloride, said fluorescent agent being present in quantity of 10 to 30% by weight of the entire composition, said co-solvent being present in quantity of 5 to 30% by weight, and said salts being present in a quantity not exceeding 6 moles of total salts per mole of fluorescent whitening agent present in said composition.

4. The composition of claim 3, wherein said co-solvent is triethanolamine.

5. The process of producing a readily dilutable composition adapted for use as a brightening agent for cotton fibers and paper, which comprises condensing, in aqueous acetone medium, essentially two moles of cyanuric chloride with one mole of 4,4'-diamino-2,2'-stilbenedi(sodium sulfonate), condensing the intermediate product thus obtained with two moles of sodium sulfanilate, further condensing the reaction mass with two moles of diethanolamine, adding to the reaction mass a co-solvent selected from the group consisting of (a) alkanolamines of the formula $(HO\text{-alk})_x\text{—}NR_{3-x}$, wherein alk is a bivalent alkane radical of 2 to 4 carbon atoms, R is a member selected from the group consisting of hydrogen and alkyl of 1 to 2 carbon atoms, and $x$ is an integer from 1 to 3, and (b) a polyethylene glycol of the formula $H(OCH_2CH_2)_nOH$, wherein $n$ is an integer from 4 to 6, and heating the resulting mixture to drive off water and acetone until an aqueous concentrate containing, by weight, from 10 to 30% of said triple condensation product is obtained.

6. A process as in claim 5, wherein each condensation step is effected in the presence of an acid binding agent, the binding agent in the first two steps being a member of the group consisting of sodium hydroxide and sodium carbonate and the binding agent in the third condensation step being a member of the group consisting of sodium hydroxide, sodium carbonate and an excess of the diethanolamine employed in said third condensation step.

References Cited in the file of this patent

UNITED STATES PATENTS

| | | |
|---|---|---|
| 2,171,427 | Leipzig et al. | Aug. 29, 1939 |
| 2,595,030 | Wallace | Apr. 29, 1952 |
| 2,763,650 | Ackermann | Sept. 18, 1956 |
| 2,878,248 | Crounse | Mar. 17, 1959 |

FOREIGN PATENTS

| | | |
|---|---|---|
| 647,718 | Great Britain | Dec. 20, 1950 |
| 128,651 | Australia | Mar. 16, 1945 |

OTHER REFERENCES

Ser. No. 381,856, Wendt (A.P.C.), published May 11, 1943.

UNITED STATES PATENT OFFICE
CERTIFICATE OF CORRECTION

Patent No. 3,025,242                       March 13, 1962

Ralph Crawford Seyler

It is hereby certified that error appears in the above numbered patent requiring correction and that the said Letters Patent should read as corrected below.

Column 1, line 21, for "isolations" read -- isolation --; column 2, line 56, for "the" read -- and --; column 3, line 20, for "a", first occurrence, read -- as --; columns 3 and 4, lines 8 to 20, and columns 5 and 6, lines 31 to 43, for the lower right-hand portion of the formulas reading "$N(CH_2CH_2OH)$", each occurrence, read -- $N(CH_2CH_2OH)_2$ --.

Signed and sealed this 26th day of June 1962.

(SEAL)
Attest:

ERNEST W. SWIDER
Attesting Officer

DAVID L. LADD
Commissioner of Patents